(12) United States Patent
Henson (10) Patent No.: US 6,821,600 B1
(45) Date of Patent: Nov. 23, 2004

(54) PORTABLE CONTAINMENT SYSTEM

(75) Inventor: Jerry Henson, Raeford, NC (US)

(73) Assignee: McMurray Fabrics, Inc., Aberdeen, NC (US)

( * ) Notice: Subject to any disclaimer, the term of this patent is extended or adjusted under 35 U.S.C. 154(b) by 1 day.

(21) Appl. No.: 10/392,348

(22) Filed: Mar. 19, 2003

Related U.S. Application Data (60) Provisional application No. 60/365,899, filed on Mar. 20, 2002.

(51) Int. Cl.[7] .............................................. B32B 3/06
(52) U.S. Cl. ............................. 428/99; 383/4; 383/14; 383/20; 383/25; 224/486; 190/1
(58) Field of Search ................................ 428/99; 383/4, 383/6, 14, 20, 25, 117; 224/577, 486, 484, 542, 549, 275; 294/149; 190/1

(56) References Cited

U.S. PATENT DOCUMENTS 2,405,517 A * 8/1946 Plummer .................... 206/162

* cited by examiner

Primary Examiner—Alexander S. Thomas
(74) Attorney, Agent, or Firm—Kilpatrick Stockton LLP (57) ABSTRACT

A portable containment system including a open weave netting side and a solid fabric backing that is foldable about a center support structure allows quick and easy storage and transportation of items in a vehicle cargo or trunk area. The portable containment can be used for both storing and manually transporting items outside a vehicle.

1 Claim, 6 Drawing Sheets

PORTABLE CONTAINMENT SYSTEM

CROSS-REFERENCE TO RELATED APPLICATIONS

This application claims priority to pending U.S. Provisional Patent Application Ser. No. 60/365,899, filed Mar. 20, 2002, which is hereby incorporated herein by reference in its entirety.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates to a vehicle cargo or trunk area storage system, and in particular, to a vehicle cargo or trunk area storage system that is portable. Embodiments of the present invention are advantageous for providing containment of items in an easily accessible fabric structure useful for both storing and manually transporting items.

BACKGROUND OF THE INVENTION

Many vehicles today incorporate a wide array of convenience nets, storage trays, and other convenience compartments for storing personal items. Conventional vehicle storage nets have a number of disadvantages. For example, conventional vehicle storage nets often have an open portion that allows items contained within the net to become dislodged during vehicular movement. To address this problem, other storage devices include a closure mechanism, such as a drawstring, for closing the top of a container after items have been placed inside. While this approach solves one problem, it is disadvantageous in that successfully closing the opening of such storage devices often requires two hands to simultaneously manipulate the storage container and closure mechanism together.

Still other conventional vehicle storage compartments and nets are permanently attached to the frame or other structure within the cargo or trunk area of a vehicle. As a result, such storage devices are not removable. Instead, in order to transport the contents of a vehicle storage device to another location, the storage device must be opened and the items removed and either individually transported or loaded into another container for transportation.

Thus, there is a need for a vehicle storage system that securely stores items contained in the system during vehicular movement and that is portable.

SUMMARY OF THE INVENTION

The present invention provides a portable containment system useful for storing items in a vehicle cargo or trunk area and for manually transporting the contained items.

In one aspect of the present invention, a portable containment system is adapted to securely contain items for storage and/or transport in a vehicle cargo or trunk area. A portable containment system of the present invention includes a rectangular-shaped, solid fabric backing overlaid with two sections of mesh-type netting. The two sections of netting have a length such that the edges of the netting are spaced apart in the center of the containment system. The portable containment system has two sides and two ends in the rectangular shape. Each of the ends of the containment system has a length of end webbing covering the edge of each end. Each side of the containment system has a length of side webbing covering the edge of the side.

The side webbing includes a portion extending beyond the edge of each side to form a lengthwise tubular channel, or cord sheath. A stretchable cord, such as an elastic cord, extends the length of each side inside the cord sheath and beyond each end of the cord sheath on each side. At each terminus of the stretchable cord at the end of the cord sheath, the cord forms a continuous cord loop. An attachment clip is attached to each cord loop at each end of the stretchable cord on both sides of the containment system. Each clip includes a biased closure mechanism for removably attaching the portable containment system to an attachment surface in a vehicle cargo or trunk area Along the center of the portable containment system, a center support structure extends the width of the containment system between the sides. The center support structure is securely attached to the fabric backing by stitches sewn through a center webbing material around the center support structure and through the fabric backing. A handle is attached the center support structure in the center of the containment system. The longitudinal axis of center support structure forms a fold axis for the portable containment system. At the edge of each section of netting near the center support structure, an elastic cord is extended through the netting and is attached to each side to form an expandable opening of each section for placing and removing items to be contained in the containment system. One section of the netting, attached on each side with side webbing and on the end with end webbing and having the elastic cord interwoven through the edge of the netting near the center support structure, comprises a first component of the portable containment system. The other section of the netting, attached on each side with side webbing and on the end with end webbing and having the elastic cord interwoven through the edge of the netting near the center support structure, comprises a second component of the portable containment system. The first component and the second component are separate and allow items to be stored and/or transported while separated from other items. The portable containment system provides a fully enclosed system for containing desired items.

The portable containment system further includes an attachment means that allows the system to be removably attached to a vehicle cargo or trunk area. In embodiments, the attachment means includes a clip attached to the cord loop at each of the four corners of the containment system. The clips have a biased closure mechanism. The clips are pressed open and engaged around an attachment surface, such as a bring that is often found as standard equipment in vehicle cargo areas and trunks. When the closure mechanism is released the closure mechanism is automatically biased closed around the D-clip.

In another aspect of the present invention, a portable containment system, and the contents contained therein, is easily manually transportable. The portable containment system includes a means for manually transporting the containment system and the contents within the containment system. The portable containment system includes a center support structure extending between the cords on opposite sides along the middle of the containment system. The center support structure further includes a handle attached to the center support structure for grasping the portable containment system to facilitate its removal from a vehicle cargo or trunk area. Removing the portable containment system from a vehicle cargo or trunk area involves disengaging the attachment means, such as a biased-closed clip at each corner, from the attachment surfaces in the cargo or trunk area. When the handle and attached center support structure are lifted, the two ends of the containment system are folded together and depend downwardly from the center support structure. In this manner, the portable containment system can be readily transported to a desired location.

In embodiments of the present invention, the handle is formed as an integral part of the center support structure of the portable containment system, rather than as a separate structure. As such, there is no separate protrusion of the handle from the portable containment system. As such, the portable containment system is maintained in a low profile position against the vehicle cargo or trunk area surfaces. The handle location in the center of the center support structure allows both compartments to be easily accessible while manually transporting the containment system. In addition, with the handle in the center of the center support structure, the containment system can be held with one hand, and items can be easily removed or added with the other hand. The location of the handle and the center fold allow the portable containment system to depend freely from the center support structure when in folded position This allows a user to transport the containment system in a natural manner next to their side and without awkward movements.

The handle, in conjunction with the center support structure, provides a load-balancing fulcrum. With the handle attached to or integral with the center support structure, manipulation of the handle effects movement of the entire containment system. Thus, in the event there is uneven weight distribution due to the weight and location of items in the containment system, the system can be transported at the location of the center support structure that is necessary to balance the load evenly. Accordingly, there is no need to move the contents of the portable containment system around in order to balance the load.

Because it is portable, a containment system of the present invention allows a user to conveniently load loose items such as soccer balls, gloves, shoes, games, dolls, toys, etc. into the portable containment system while still in the user's home, garage, or storage building. Once items are placed into the portable containment system at the location(s) where the items are located, the user can then transport the containment system and the contained items to a vehicle. The portable containment system is then attached to the vehicle cargo or trunk area. Items stored within the containment system are effectively prevented from rolling or sliding around in the vehicle cargo or trunk area while the vehicle is moving. Finally, upon arriving at a location, for example, a ball field, hotel, shopping mall, or fitness center, the user can easily remove the portable containment system from the vehicle and transport it to the location where the items will be used.

In yet another aspect of the present invention, a portable containment system comprises an open face and a closed backing that permit varying degrees of visibility of items contained within the system. When the portable containment system is oriented so that the open face is upward, the contents stored and/or transported in the portable containment system are readily visible. The open face can be, for example, a mesh or netting material, that allows viewing of the contained items. When quick and easy access is desired to stored and/or transported items, such as tools or emergency supplies, visibility of the items in the container is beneficial.

When the portable containment system is oriented so that the closed backing is upward, the contents stored and/or transported in the portable containment system are hidden from view. The closed backing, such as a solid fabric material, allows storage and transport of items without the items being visible through the portable containment system. The ability to store items out of the view of others is useful for protecting valuable items from view by persons outside a parked vehicle, for example.

In a similar manner, items transported manually in the portable containment system can be left visible by transporting the portable containment system with the open face oriented upward. Alternatively, items transported manually in the portable containment system can be hidden from view by transporting the portable containment system with the closed backing oriented upward.

In addition to protecting items contained in the portable containment system from visibility directly, the closed backing can also serve as an indirect security shade. The portable containment system can be attached in the vehicle cargo or trunk area in a variety of positions that permit different areas to be shielded or shaded. The portable containment system can be positioned horizontally directly below the vehicle's window to block both sun and visibility from outside the vehicle through the particular window. The portable containment system can also be positioned in an inclined, or slanted, position from behind a seat to a point on the vehicle cargo area at a distance from the seat. Alternatively, the center support structure of the portable containment system can be positioned across and above the vehicle cargo area with the four corners of the containment system attached to fastening means, such as D-rings, on the cargo area floor. This arrangement provides a tent-shaped security shade that can cover large items in the vehicle cargo area. In other embodiments, the portable containment system is attachable in a vertical orientation behind a vehicle rear seat or at the vehicle rear door to provide shielding and/or shading from the seat or rear door areas.

In another configuration, items to be contained are placed on the floor of a vehicle cargo or trunk area. A portable containment system of the present invention is then laid substantially flat on top of the items of the cargo or trunk floor. The portable containment system is attached to the attachment surfaces, for example, D-rings, on the cargo or trunk area floor. The amount of stretch in the stretchable side cord along at least two sides of the containment system allows items to be held in place underneath the system. As a result, items underneath the containment system are secured and will not roll, slide, or rattle in the cargo or trunk area during vehicular movement.

Because the portable containment system is foldable, it is manageable while being transported. For example, after being transported to a user's home, office, gym, or other location, the portable containment system is easily draped over the back of a chair, on the side or tailgate of a truck, over a railing, over a clothes rack, or many other available surfaces.

Features of a portable containment system of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A portable containment system of the present invention provides numerous advantages over prior vehicle storage devices. For example, the present invention advantageously provides a containment system that is securely attachable to a vehicle cargo or trunk area to reliably contain items during vehicular movement.

Another advantage is that the present invention provides a containment system that is portable.

Another advantage is that the present invention provides a portable containment system that is attachable to a vehicle cargo or trunk area in a variety of configurations, including horizontally and vertically.

Another advantage is that the present invention provides a containment system that serves as its own security shade to hide contents from view from outside a vehicle or when transporting the system.

Another advantage is that the present invention provides a containment system that includes an open mesh side for viewing the contents of the containment system when desired.

Another advantage is that the present invention provides a containment system that, due to its flexibility of attachment, can be attached to a vehicle cargo or trunk area to prevent contents from rolling, bouncing, or sliding around during vehicle movement.

Another advantage is that the present invention provides a containment system that can be easily installed and easily removed in the trunk or cargo area of a vehicle.

Another advantage is that the present invention provides a containment system that includes at least two separate compartments for storage.

Another advantage is that the present invention provides a containment system that folds compactly and can be carried naturally by one's side. In addition, a portable containment system of the present invention can be easily carried with one hand.

Another advantage is that the present invention provides a containment system into which items can be placed or removed with one hand while carrying the system in the other hand.

Another advantage is that the present invention provides a containment system having a handle that is integrally connected to a center support structure such that the need to evenly distribute the weight of the contents in the system is avoided.

Another advantage is that the present invention provides a containment system that has a low profile design.

As will be realized by those of skill in the art, many different embodiments of a portable containment system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

FIGS. 1–6 show various embodiments of a portable containment system of the present invention.

Figure 1:
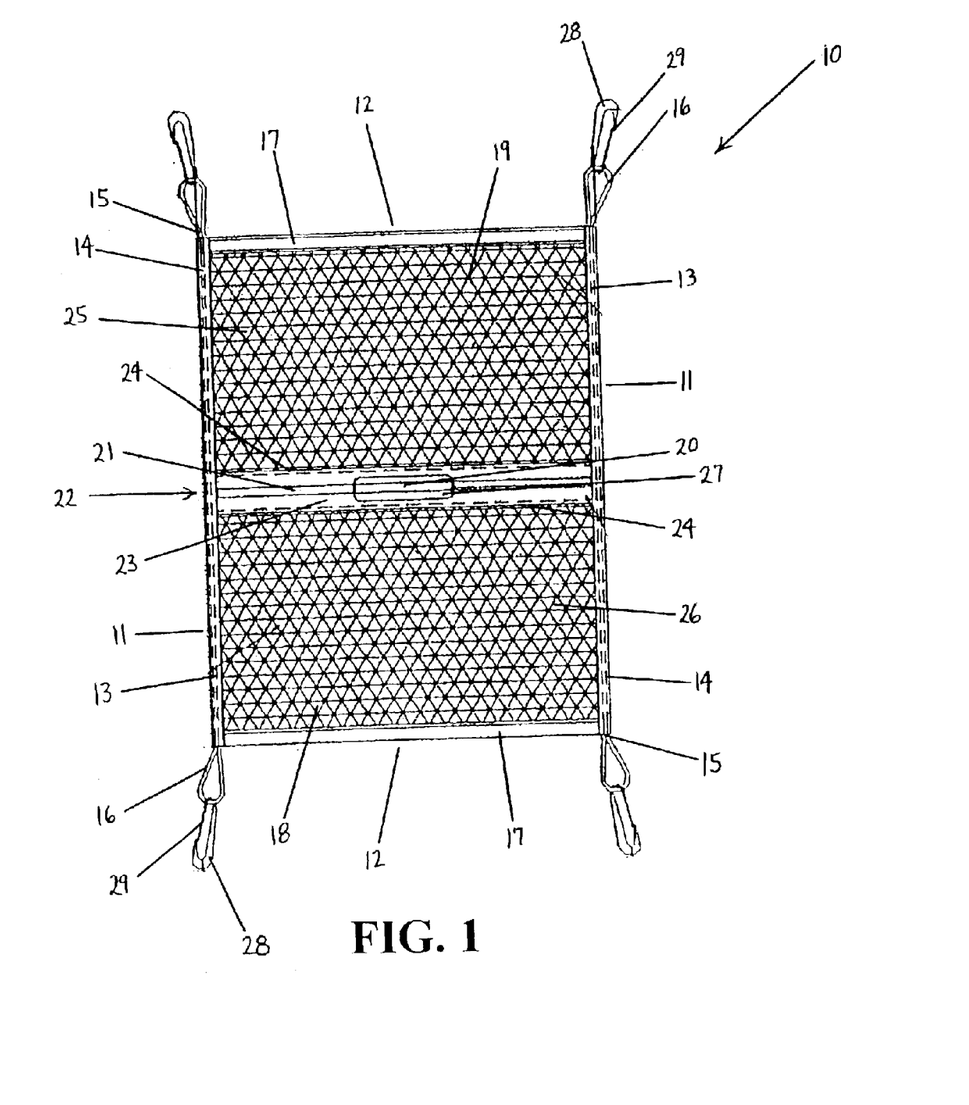
FIG. 1 is a top plan view of a portable containment system in an embodiment of the present invention.
Figure 2:
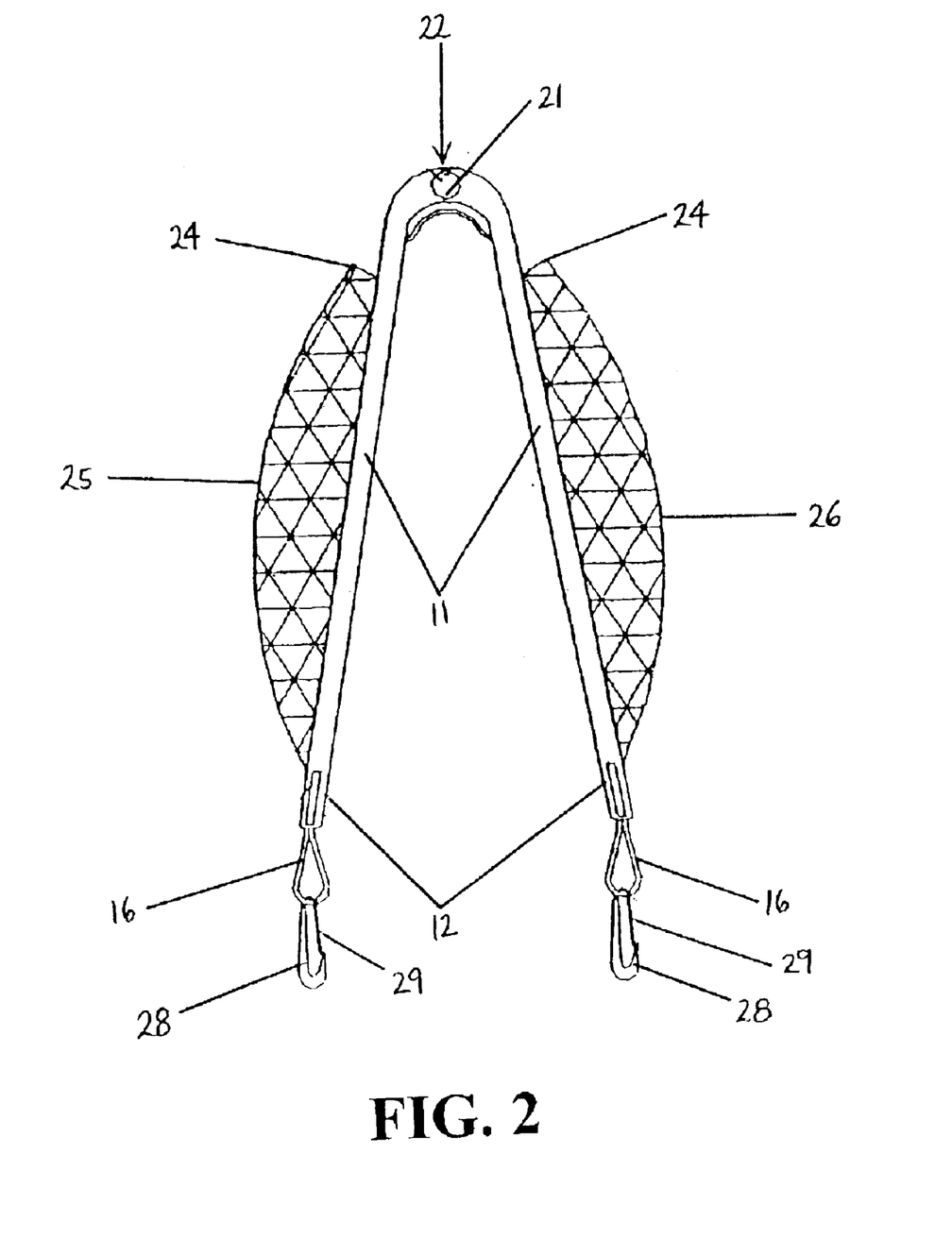
FIG. 2 is a side view of the portable containment system in FIG. 1, showing the system in folded position for manual transportation in an embodiment of the present invention.
Figure 3:
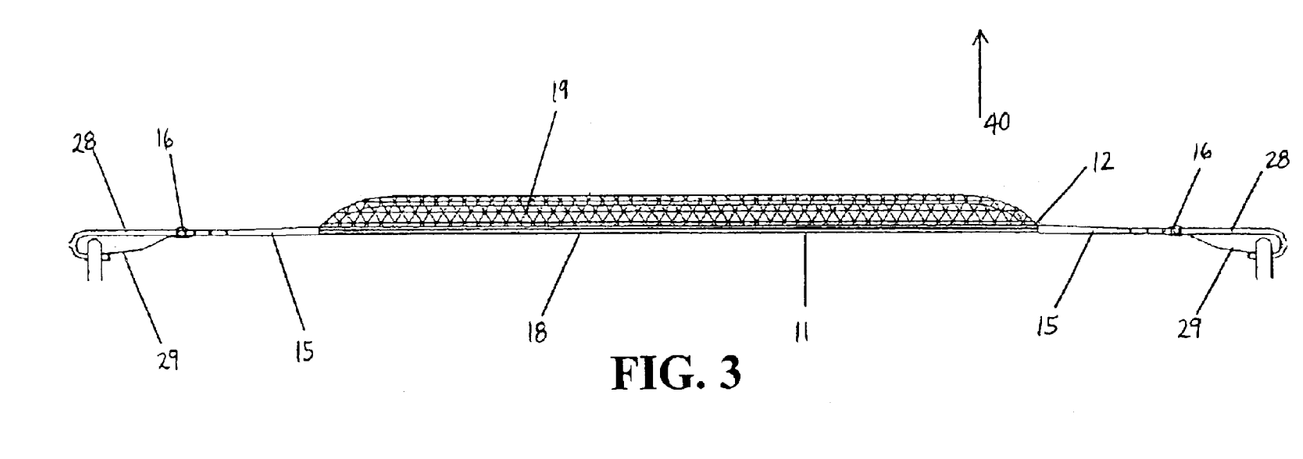
FIG. 3 is a side view of the portable containment system in FIG. 1, showing the system attached to the floor of a vehicle cargo area in an embodiment of the present invention.
Figure 4:
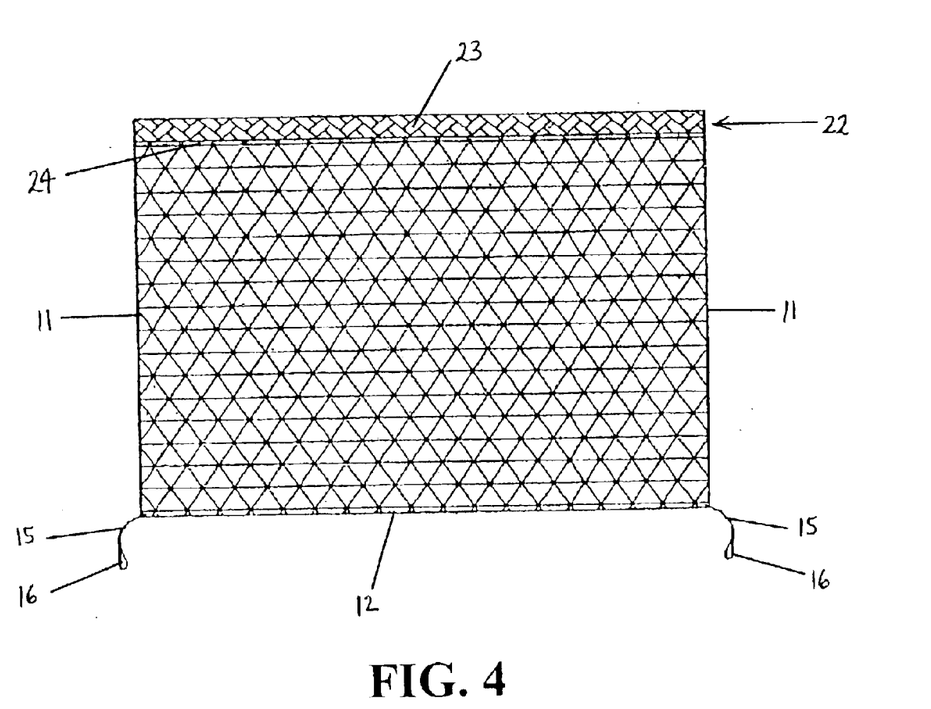
FIG. 4 is a view of one half of the folded portable containment system in FIG. 2 in an embodiment of the present invention.
Figure 5:
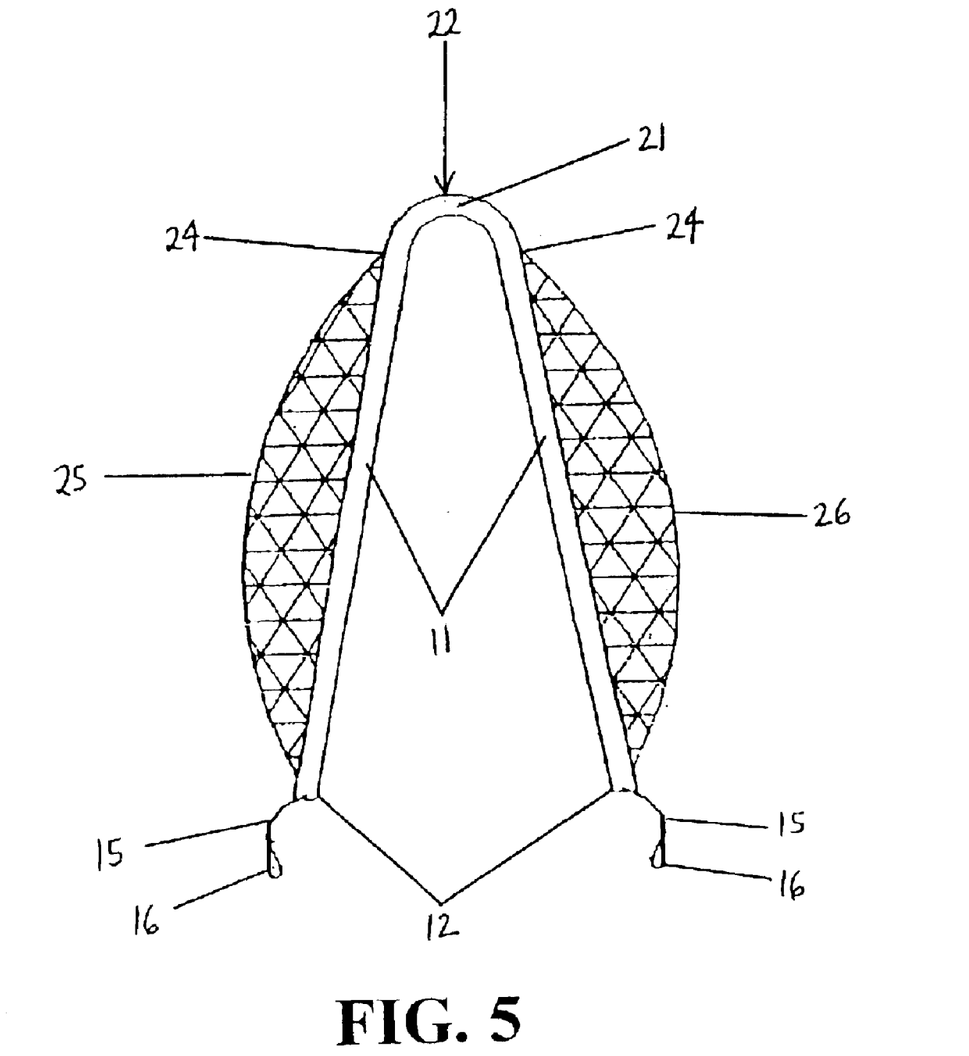
FIG. 5 is side view of another portable containment system in an embodiment of the present invention.

In one aspect of the present invention, a portable containment system is adapted to securely contain items for storage and/or transport in a vehicle cargo or trunk area. A portable containment system 10 of the present invention includes a rectangular-shaped, solid fabric backing 18 overlaid with two sections of mesh-type netting 19. The two sections of netting 19 have a length such that the edges of the netting 19 are spaced apart in the center 20 of the containment system 10. The portable containment system 10 has two sides 11 and two ends 12 in the rectangular shape. Each of the ends 12 of the containment system 10 has a length of end webbing 17 covering the edge of each end 17. Each side 11 of the containment system 10 has a length of side webbing 13 covering the edge of the side 11.

The side webbing 13 includes a portion extending beyond the edge of each side 11 to form a lengthwise tubular channel, or cord sheath 14. A stretchable cord 15, such as an elastic cord, extends the length of each side 11 inside the cord sheath 14 and beyond each end of the cord sheath 14 on each side 11. At each terminus of the stretchable cord 15 at the end of the cord sheath 14, the cord 15 forms a continuous cord loop 16. An attachment clip 28 is attached to each cord loop 16 at each end of the stretchable cord 15 on both sides 11 of the containment system 10. Each clip 28 includes a biased closure mechanism 29 for removably attaching the portable containment system 10 to an attachment surface in a vehicle cargo or trunk area.

Along the center 20 of the portable containment system 10, a center support structure 21 extends the width of the containment system 10 between the sides 11. The center support structure 21 is securely attached to the fabric backing 18 by stitches sewn through a center webbing material 23 around the center support structure 21 and through the fabric backing 18. A handle 27 is attached the center support structure 21 in the center 20 of the containment system 10. The longitudinal axis of center support structure 21 forms a fold axis 22 for the portable containment system 10. At the edge of each section of netting 19 near the center support structure 21, an elastic cord 24 is extended through the netting 19 and is attached to each side 11 to form an expandable opening of each section for placing and removing items to be contained in the containment system 10. One section of the netting 19, attached on each side 11 with side webbing 13 and on the end with end webbing 17 and having the elastic cord 24 interwoven through the edge of the netting 19 near the center support structure 21, comprises a first component 25 of the portable containment system 10. The other section of the netting 19, attached on each side 11 with side webbing 13 and on the end with end webbing 17 and having the elastic cord 24 interwoven through the edge of the netting 19 near the center support structure 21, comprises a second component 26 of the portable containment system 10. The first component 25 and the second component 26 are separate and allow items to be stored and/or transported while separated from other items. The portable containment system 10 provides a fully enclosed system for containing desired items.

Figure 6:
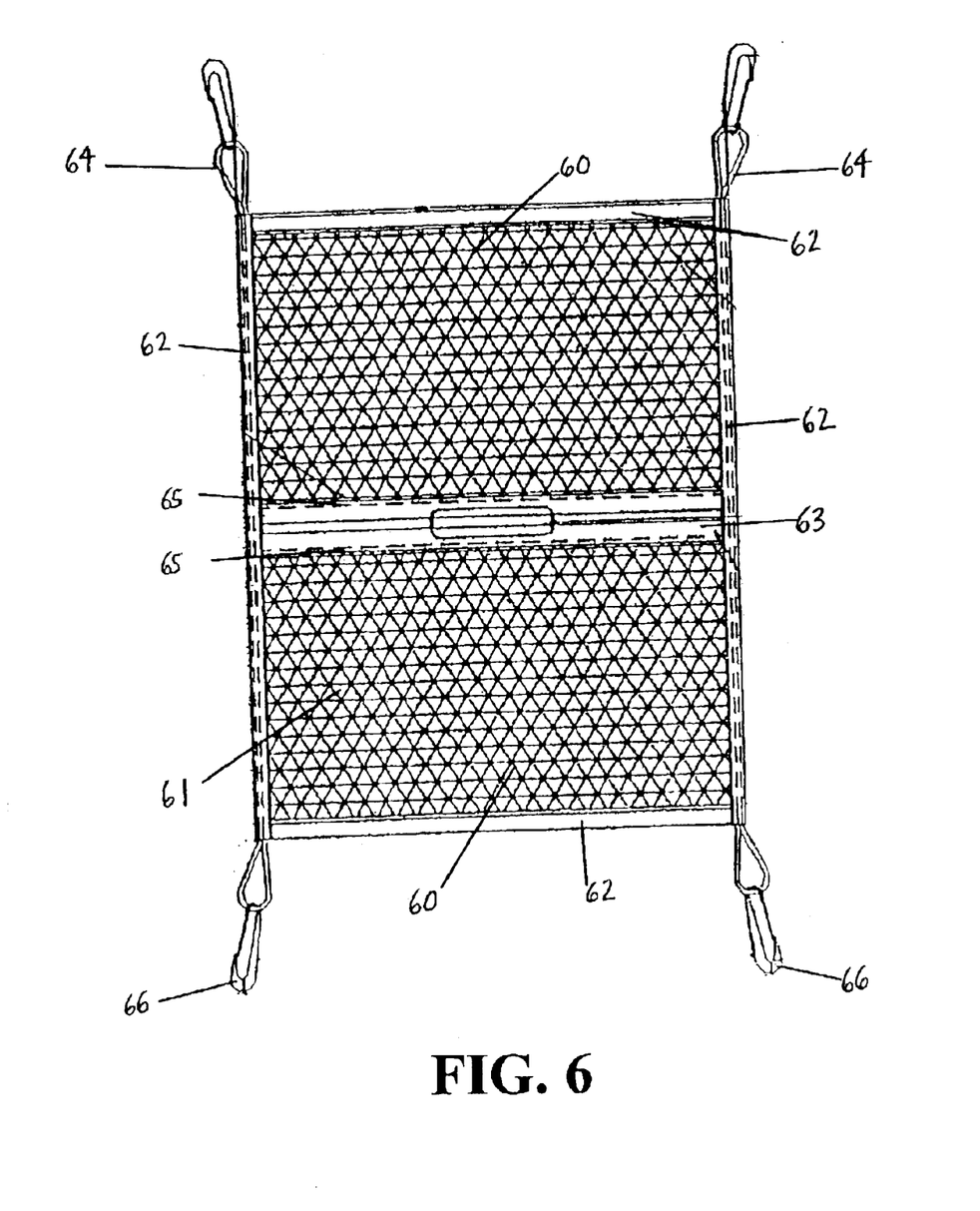
FIG. 6 is a top plan view of the portable containment system in FIG. 1 showing dimensions in an embodiment of the present invention.

FIG. 6 illustrates preferred materials used in making a portable containment system 10 of the present invention. Table 1 provides a description of materials and material specifications for the portable containment system in FIG. 6. The reference numbers in parentheses in the "number" column of Table 1 refer to the location of the materials in the embodiment in FIG. 6.

TABLE 1

MATERIALS

| Number | Color | Description | Qty | Specification |
|---|---|---|---|---|
| 657.1016 (60) | Black | KR-657 Netting 70 mm, 23/24, nylon | 1 pc | Cut two pieces to 18 diamonds long by 11 tall. selvedge top side. Weight 263.45 g or 0.581 lbs. |
| 4118.1016 (63) | Black | BC-118 Webbing 3⅞ ± ⅛ ed. X0.07 ± 0.01 thick Polypro | 3.41 ft | 1 piece. Middle webbing to 1040 ± 10.0 mm. Estimate weight 81.065 g or 0.179 lbs. |
| 10040.1016 (62) | Black | KR-1050/4 Webbing | 0.186 yds | one piece cut to 170 ± 5.0 mm. (handle) Weight 3.14 g or 0.0069 lbs. |
| 10208.1016 | Black | BT69 Thread | 0.002 lb | |
| 137.1016 (64) | Black | BE-137 Cord 4.5 mm Diameter, Polypropylene 65% | 6.68 ft | cut two pieces to 1017 ± 10.0 mm. loop size compressed 25 mm. Weight 29.38 g or 0.065 lbs. |
| 10078.1018 (66) | Natural | PC-112 Clip | 4 pc | Weight 14.52 g or 0.032 lbs. |
| 10599.1018 | Natural | Tape Double Faced Tape ¼" wide | 8.4 yds | Two lines each webbing. |
| 10040.1016 | Black | KR-1050/4 Webbing | 4.47 yds | two pieces both sides cut to 975 ± 5 mm. two pieces bottom sides cut to 1070 ± 5 mm. Weight 75.36 g or 0.166 lbs. |
| 99999.0000 | | TBD | 2 pc | Two plastic plates. Cut to 957 long x 15 mm tall. round corner. Weight 38.97 g or 0.086 lbs. |
| 99999.0000 | | TBD | 1 pc | Metal rod (same used ADR 771 last sample). diameter 19 mm. Cut length 964 ± 5.0 mm. Weight 385.39 g or 0.850 lbs. |
| 10074.1016 (65) | Black | BE-122 Flat Cord 9.6 mm Wide, 3.0 mm thick, Nylon | 6.3 ft | two pieces weave through net. Cut length 960 ± 5.0 mm. Weight 38.10 g or 0.084 lbs. |
| 99999.0000 | | TBD | 2 pc | end caps attached to internal rod. |
| 424.1924 (61) | Black (KC-424) | 424 Cloth Mesh/Dyed Fabrics | 0.97 ly | one piece. Cut to 927 mm tall x 1020 width. Estimate weight 25.60 g or 0.056 lbs. |

The center support structure 21 can be flat in shape or round or a variation thereof. The first and second compartments 25, 26 may be further subdivided into four or more smaller compartments. The compartments may be opened and closed with zippers. Further, the compartments may comprise open or closed netting or closed fabric. Closed fabric diminishes the visibility of the contents being held inside the compartments. The handle 27 may be attached as a separate structure. The attachment means of the portable containment system 10 to the cargo or trunk area of the vehicle, loops, hooks and similar attachment means may be used on the system. A loop attachment means would connect to a t-type fastener located in the vehicle. A hook attachment means would connect to a D-ring fastener in the vehicle.

Although the present invention has been described with reference to particular embodiments, it should be recognized that these embodiments are merely illustrative of the principles of the present invention. Those of ordinary skill in the art will appreciate that a portable containment system of the present invention may be constructed and implemented in other ways and embodiments. Accordingly, the description herein should not be read as limiting the present invention, as other embodiments also fall within the scope of the present invention.

What is claimed is:

1. A portable containment system, comprising:

a rectangular-shaped, solid fabric backing overlaid with two sections of netting, the two sections of netting spaced apart in a center of the fabric backing to form a first compartment and a second compartment;

two sides and two ends;

a webbing covering each side and each end;

the webbing of each side forming a cord sheath for housing a stretchable cord;

the stretchable cord having ends, each end forming a continuous loop;

an attachment clip attached to each cord loop for attaching to an attachment surface;

a center support structure extending between the sides in the center of the fabric backing;

a handle secured to the center support structure;

the center support structure having a longitudinal axis forming a fold axis for the first and second compartments; and each of the first and second compartments including an elastic cord woven into the netting and extending between each side to form an openable top;

wherein the portable containment system provides for storage and transportation of items contained in the portable containment system.

* * * * *